United States Patent [19]

Chomel

[11] Patent Number: 5,254,244
[45] Date of Patent: Oct. 19, 1993

[54] MODULAR MIXER-SETTLER HAVING SEPARATE STAGES MANIPULATABLE BY TELEMANIPULATOR

[75] Inventor: Rodolph Chomel, Camaret/Aygues, France

[73] Assignee: Cogema Compagnie Generale des Matieres Nucleaires, France

[21] Appl. No.: 932,691

[22] Filed: Aug. 20, 1992

[30] Foreign Application Priority Data

Sep. 5, 1991 [FR] France .................. 91 10983

[51] Int. Cl.⁵ .............................................. B01D 11/04
[52] U.S. Cl. ........................................ 210/95; 210/232;
210/511; 414/8; 414/909; 422/50; 422/106;
422/258; 422/259
[58] Field of Search ................... 414/909, 8; 901/50;
422/106, 107, 108, 258, 259, 50, 55, 63; 210/94,
143, 237, 511, 634, 95, 97, 513; 252/631

[56] References Cited

U.S. PATENT DOCUMENTS

| | | | |
|---|---|---|---|
| 3,489,526 | 1/1970 | Roy et al. | 422/259 |
| 3,663,178 | 5/1972 | Miller et al. | 422/259 |
| 3,692,494 | 9/1972 | Bathellier et al. | 422/259 |
| 3,835,617 | 9/1974 | Stock et al. | 53/428 |
| 3,966,175 | 6/1976 | Stock et al. | 252/631 |
| 4,292,277 | 9/1981 | Bonney et al. | 422/259 |
| 4,572,710 | 2/1986 | Stock et al. | 210/237 |
| 4,664,873 | 5/1987 | Hendrich et al. | 414/8 |
| 4,830,835 | 5/1989 | Evers | 210/511 |
| 5,104,524 | 4/1992 | Eiben et al. | 210/511 |
| 5,139,744 | 8/1992 | Kowalski | 422/63 |
| 5,141,378 | 8/1992 | Lestournel et al. | 414/909 |

FOREIGN PATENT DOCUMENTS

| | | |
|---|---|---|
| 0355159 | 12/1987 | European Pat. Off. . |
| 1156383 | 7/1957 | Fed. Rep. of Germany . |
| 1519833 | 10/1965 | Fed. Rep. of Germany . |
| 2000991 | 1/1970 | Fed. Rep. of Germany . |
| 2039211 | 8/1970 | Fed. Rep. of Germany . |
| 1495167 | 9/1966 | France . |
| 2028208 | 1/1970 | France . |
| 2055947 | 4/1970 | France . |
| 146149 | 1/1981 | German Democratic Rep. ........... 422/259 |
| 402371 | 3/1974 | U.S.S.R. ........... 422/258 |
| 716565 | 2/1980 | U.S.S.R. ........... 422/259 |

*Primary Examiner*—Joseph W. Drodge
*Attorney, Agent, or Firm*—Pearne, Gordon, McCoy & Granger

[57] ABSTRACT

A mixer-settler is provided which is modulatable and permits use, manipulation and maintenance within a tight, shielded enclosure using a telemanipulator. The mixer-settler is constituted by several modules (M1, M2, M3), which can be reciprocally dismantled by using tight connecting means (19, 20, 21). The inlets and outlets (17, 18) for the heavy and light phases are located on the front face (40) of each module. Regulating members (9, 10, 11) issue onto the upper surface of each module close to the front face (40). Preferably, shield windows (12) make it possible in each case to see the interphase of a stage comprising a mixing chamber (1) and a settling chamber (2). This is completed by a motorization assembly (3) placed above the module. Application to the treatment of radioactive liquids.

8 Claims, 5 Drawing Sheets

MODULAR MIXER-SETTLER HAVING SEPARATE STAGES MANIPULATABLE BY TELEMANIPULATOR

FIELD OF THE INVENTION

The present invention relates to mixer-settler means for the treatment of one liquid by another with or without suspended solid substances. The invention more particularly relates to laboratory mixer-settler means, which can be remotely manipulated by means of a telemanipulator. This is the case when very high activity solutions must be treated within a shielded enclosure.

PRIOR ART AND SET PROBLEM

Laboratory mixer-settler means of the type having separate stages and mechanical stirring and which are mainly made from stainless steel are heavy, cumbersome equipments. Their use and manipulation generally require the direct intervention of the operator and often the assistance of mechanical handling and lifting devices which cannot be used by solely employing a telemanipulator. The object of the invention is to obviate these disadvantages.

SUMMARY OF THE INVENTION

The main object of the invention is a mixer-settler of the type having separate stages and mechanical stirring and having for each stage a mixing chamber within which rotate a turbine rotated by motor means, a settling chamber linked with the mixing chamber, pipes for the circulation of the light or heavy phases and connected to pipes of adjacent stages, at least one inlet and one outlet for the light and heavy phases, an interphase level regulating member and members for linking the inlets and outlets for the light and heavy phases.

According to the invention, the mixer-settler has a separable module structure, each module having at least one stage and means for tight connection to at least one other module, so that each module can be manipulated by a telemanipulator, so as to permit the remote handling and use of the mixer settler when it is isolated in a tight enclosure inaccessible to an operator.

In the main construction according to the invention, the inlets and outlets are on the same front face of their module.

Moreover, it preferably comprises on each lateral face of a module two lateral openings for linking the light and heavy phases and which can be connected to corresponding lateral openings of an adjacent module.

Preferably, the members are located on the front of an upper surface of their module. Thus, the different control means of the mixer-settler are provided on the front of the apparatus.

According to a feature of the invention, each stage has a remotely dismantlable shield window placed on the front face facing the settling chamber in order to make it possible to see the interphase between the light and heavy phases. In the preferred embodiment of the mixer-settler according to the invention, each module has three stages.

Preferably, the motor means for a module are constituted by a motor placed on the upper surface driving a gear box having one outlet per stage for driving the turbine of each mixing chamber. The height position of the turbine and the rotation speed of the motor are regulatable. Preferably, the tight connecting means have a sealing plate placed between two modules at the lateral openings and a capstan locking system for locking two adjacent modules.

LIST OF DRAWINGS

The invention and its different characteristics can be gathered from the following description relative to the attached drawings, wherein show:

FIG. 1 A plan view of part of a mixer-settler according to the invention showing the dismantable character of the different modules of the mixer-settler.

FIG. 2 In section, one stage of a mixer-settler according to the invention.

FIG. 3 A front view, a module of a mixer-settler according to the invention.

FIG. 4 A flow diagram showing part of the different pipes in a module of the mixer-settler according to the invention.

FIGS. 5A and 5B Two diagrams illustrating the storage possibility of the mixer-settler according to the invention in a standardized container.

DETAILED DESCRIPTION OF AN EMBODIMENT OF THE INVENTION

Figure 1:
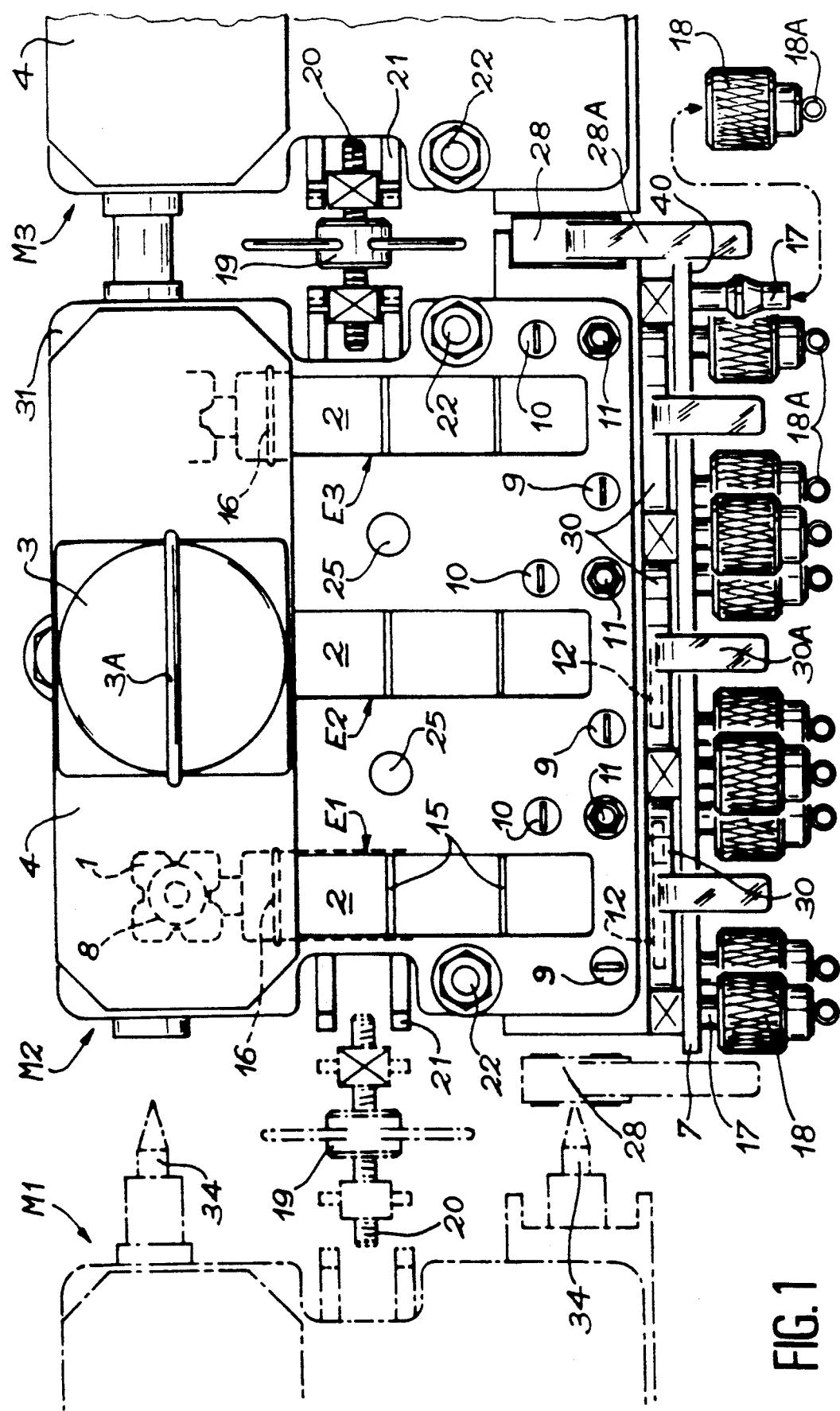

According to FIG. 1, the mixer-settler according to the invention comprises at least one, but preferably several modules M1, M2, and M3, three in the case of FIG. 1. The left-hand module M1 is shown detached from its adjacent module M2, which is shown attached to its other adjacent module M3. The modules shown have in each case three stages E1, E2 and E3. This is clearly only an example and the number of stages can vary as a function of needs.

Each stage comprises an admission chamber, which is not visible in FIG. 1, a mixing chamber 1 associated with a settling chamber 2 and to which it is connected via a distribution plate 16. The profile of this junction is clearly visible in FIG. 2. Each stage is supplied with light phase and heavy phase. In other words, each stage of a module is connected to the adjacent stage by light and heavy phase pipes. The hydraulic circuit of a module can be more clearly seen in FIG. 4 and each settling chamber 2 is connected at the top to the light phase pipe and at the bottom to the heavy phase pipe.

FIG. 1 shows for each stage, a heavy phase circulation member 9, a light phase circulation member 10 and an interphase level regulating member 11 on the side of the settling chamber 2. The use of two circulation members 9 and 10 makes it possible to channel the heavy and light phases either to the outside or to an adjacent stage. The connections to the outside are formed by male end fittings, e.g. VG-NB-type RAFIX fittings, which can be sealed by a remotely manipulatable plug 18 corresponding to the end fitting 17. The interphase level regulating member 11 makes it possible to position the interphase in the settler.

FIG. 1 also shows a motor 3 for driving three turbines, each located in a mixing chamber 1, said motor being placed on an upper plate 31 surmounting the casing of the module. It is provided with a manipulating handle 3A.

According to the invention, the mixer-settler is modulatable and this can be seen in FIG. 1 because the first module M1 is detached from the second module M2, whereas the latter is fixed to the third module M3. Thus, there are tight connecting means between at least two modules and three in the case of FIG. 1.

As shown in FIG. 1, these tight connecting means are constituted by sealing plates 28 provided with a handle 28A. The locking together of two modules takes place by using a capstan-type locking system. The capstan wheel 19 makes it possible, when rotated about its rotation axis which is in the locking direction, to move together two modules. Thus, its shaft 20 is screwed at each end in an anchoring part 21 integral with a module. During the moving together of the two modules, positioning guides 34 make it possible to reciprocally position said modules. Thus, on their lateral parts, each module has lateral communication openings both for the heavy phase and for the light phase. These openings must be positioned in corresponding manner and are not shown in FIG. 1.

Figure 2:
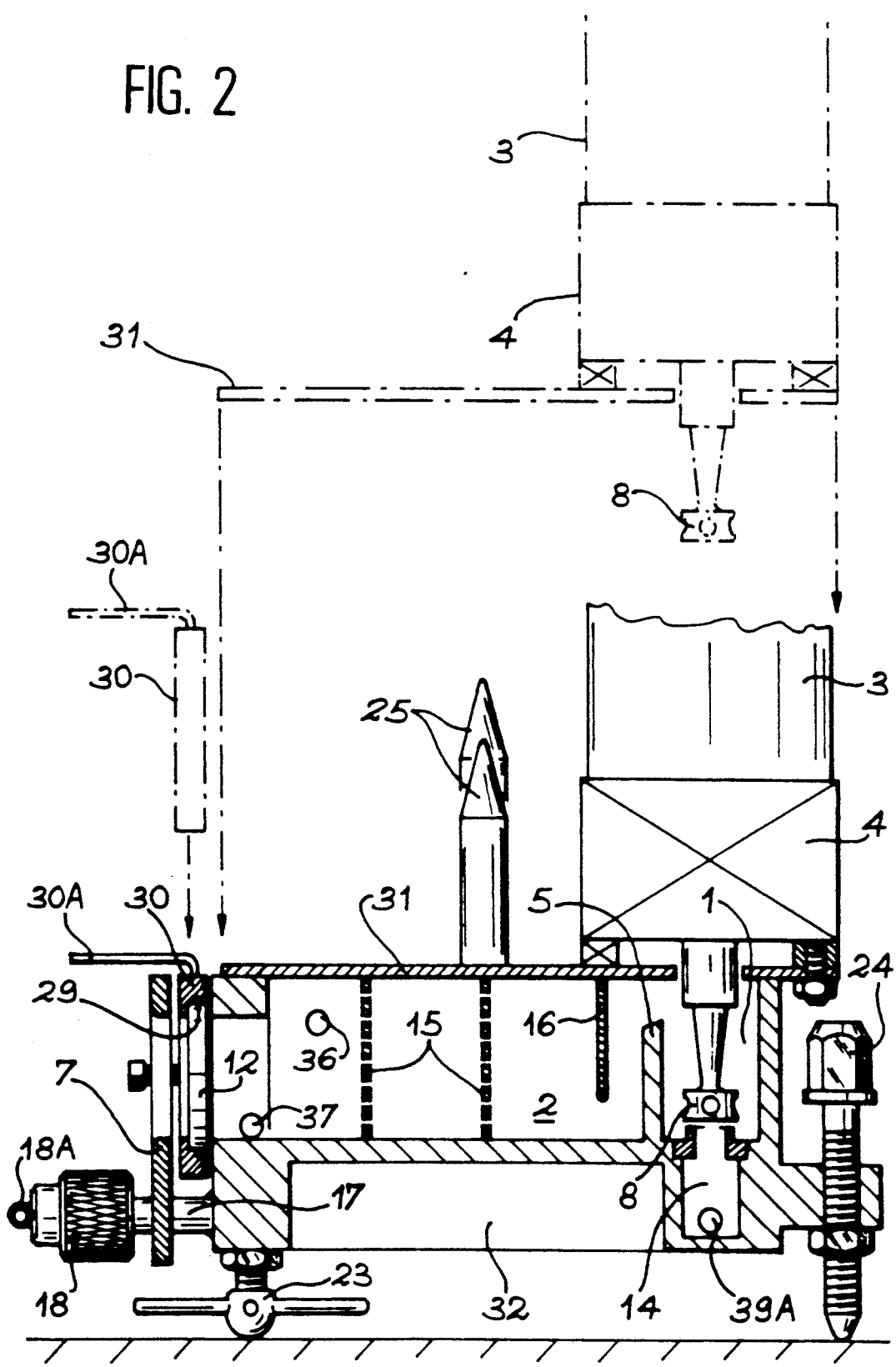

The module will now be further described relative to FIG. 2, which is a cross-section of one stage of a module. It is once again possible to see the mixing chamber 1, the settling chamber 2, an outlet end fitting 17 surmounted by its plug 18 with a gripping ring 18A and the upper plate 31 surmounted by the motor 3. The two latter elements are shown both in the upper dismantling position and in a lower use position.

By means of a gear box 4, the motor 3 drives a turbine or a stirrer 8, which acts within the mixing chamber 1. Below the turbine 8 is provided the admission chamber 14, at the level of which arrives both the light and heavy phase using an opening 39A perpendicular to the plane of FIG. 2.

The mixture obtained in the mixing chamber 1 passes into the settling chamber 2 after traversing an overflow or weir 5, a distribution plate 16 followed by several coalescence plates 15. On the other side of the settling chamber 2 a light phase discharge pipe 36 issues into the upper part and a heavy phase discharge pipe 37 into the lower part. Each of these pipes is connected both to an outlet, symbolized by an end fitting 17 and a plug 18, and to another circulating pipe of the adjacent stage.

FIG. 2 also shows a regulatable rear support 24, which enables a setting or adjustment to take place during the installation of a module. On the other side thereof is provided a front regulating wheel 23 for regulating the horizontality of the module. With a view to regulating the height position of the interphase by means of the regulating member 11, a remotely dismantlable shield window 12 is placed on the front of said settling chamber 2. The latter can be installed with the aid of a fixing flange 30 completed by at least one sealing joint 29. The locking of the assembly can take place with a front locking plate 7 positioned vertically on the front face 40, i.e. the left-hand face of the module.

It should be noted that the flange 30 for fixing the shield window 12 is equipped with a handle 30A, thus facilitating the manipulation of said flange 30 and the fitting and dismantling of the window 12. These operations can consequently be carried out relatively easily by a telemanipulator. It should be noted in this connection that the handle 30A, end fittings 17 and the plug 18 of the heavy and light phase pipes are all placed on the front face of the module. Thus, the use and the different settings with respect to such a mixer-settler constituted by a plurality of modules can take place by using a telemanipulator on the front side of the mixer-settler. In the same way, the height regulation of the front part with the aid of the wheel 23 is possible by using the same telemanipulator.

During the installation of the motor block comprising the motor 3, the gear box and the upper plate 31, use is made of vertical positioning guides 25, which position the upper plate 31 with respect to the casing of the module. In order to reduce the module weight there is a recess 32.

Figure 3:
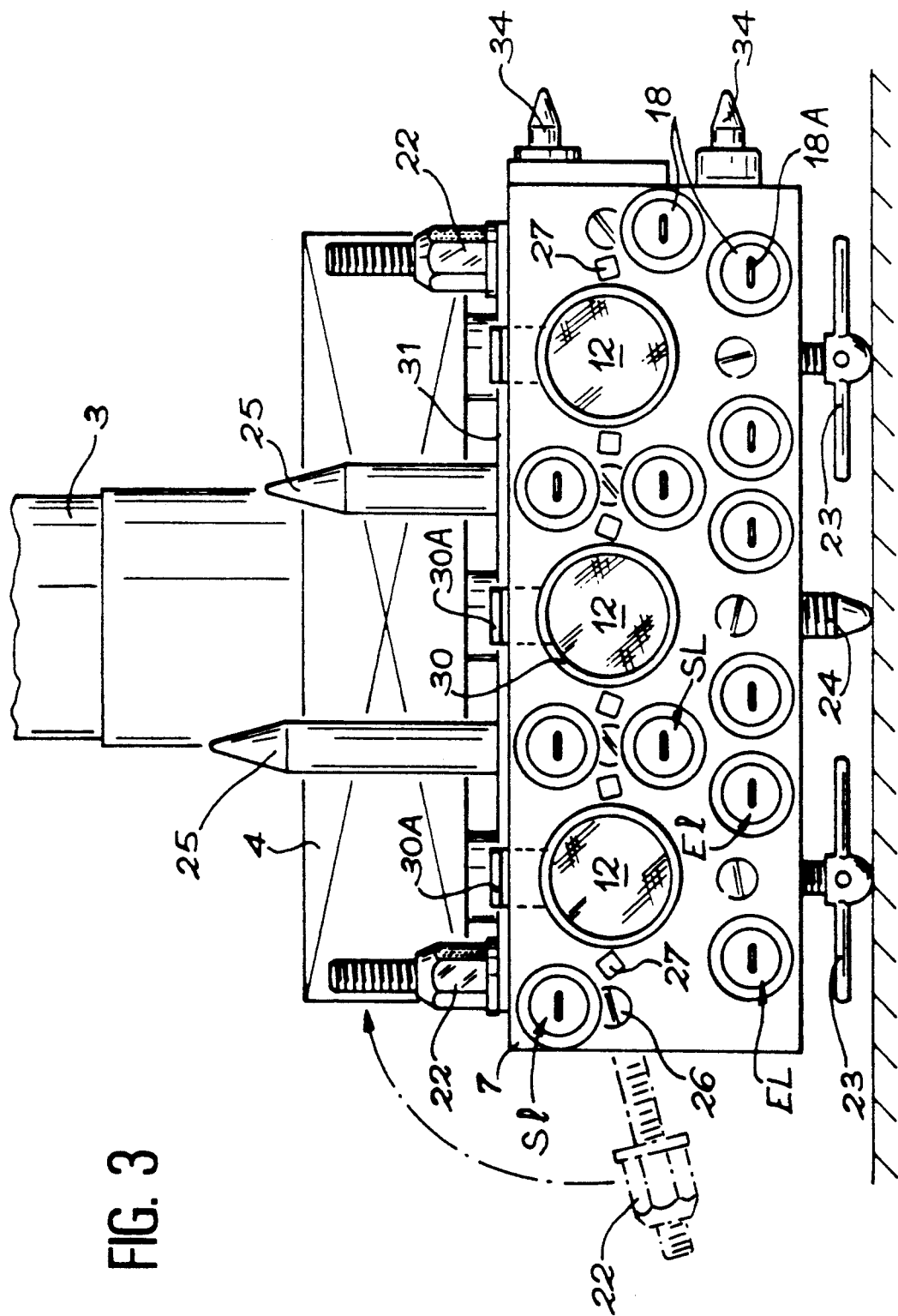

FIG. 3 shows the possibilities for the action of a telemanipulator on a module. FIG. 3 mainly shows the front face 40 of a module. It is possible to see the shield windows 12 each corresponding to one module stage. Around the window 12 there are various accesses to the light and heavy phases, said accesses being symbolized by the end fitting 17 covered by their plug 18. Thus, on considering the left-hand stage, it is possible to see in the upper part of the front face 40, an outlet SL for the light phase. The light phase inlet EL is located in the lower part of the front face. With regards to the heavy phase, the outlet SL is located at mid-height and the inlet EL at the bottom.

The easily fittable and dismantlable character of the shield windows 12, which are in this case remotely dismantlable, is made clear by the presence, for each window 12, of two front fixing screws 27. On the front face 40, it is also possible to see screws 26 for fixing the front plate 7 for the windows 12. It is also possible to see tilting bolts 22 for locking the upper plate 31 and consequently the motor assembly on the casing of the module.

Thus, for a module it is possible to use a single motor 3 for several stages. With the aid of a gear box 4 and optionally a speed reducer, it is possible to drive the turbine of each stage placed on a parallel vertical shaft and displaced with respect to the motor shaft with regards to the two end stages. The turbine rotation speed is a function of the motor supply voltage and can vary from 0 to 1750 r.p.m. The turbine height position in the mixing chamber can be modified.

Figure 4:
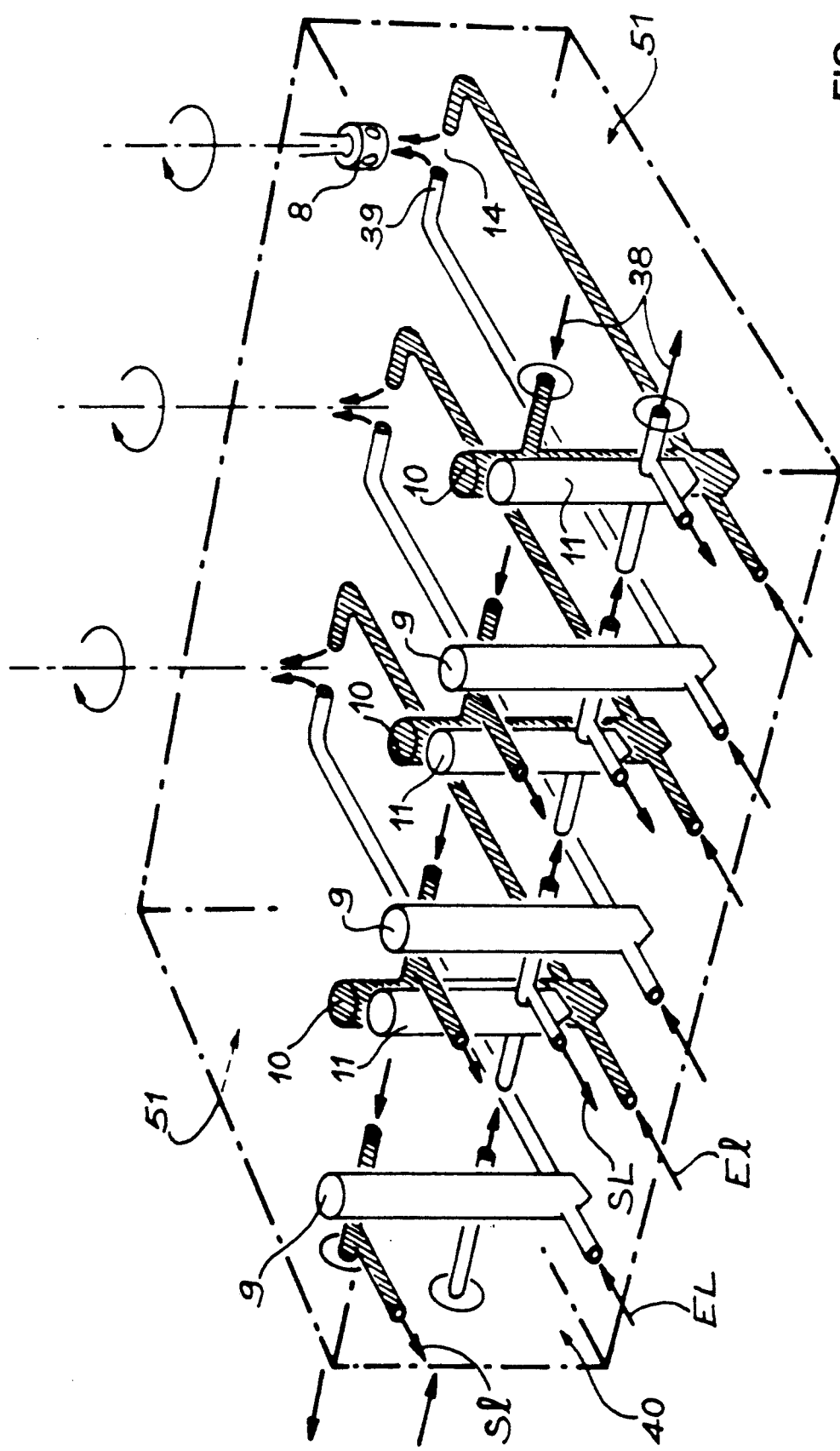

FIG. 4 diagrammatically shows the hydraulic circuit of a module with the different inlet and outlet pipes. In this cavalier perspective view, the front face 40 of the module is at the bottom left.

In general terms, the heavy phase is represented by clear pipes and the light phase by hached pipes.

For each stage, it is possible to see on the front face 40 at the top left the light phase outlet SL and at the bottom right the light phase inlet EL. In the same way, it is possible to see at mid-height the heavy phase outlet SL, whilst the heavy phase inlet EL is located at the bottom left.

As is made clear by the pipes and the axes representing them, the light phase pipes of each stage are interconnected, as are the heavy phase pipes. Moreover, for each stage, a light phase pipe and a heavy phase pipe 39 arrive at the level of the mixing chamber 14 placed below the turbine 8 of the mixing chamber.

The heavy and light phases issue by lateral openings 38 onto the lateral faces 51. The locations of these lateral openings 38 are made to correspond with the corresponding lateral openings of the adjacent module.

Figure 5:
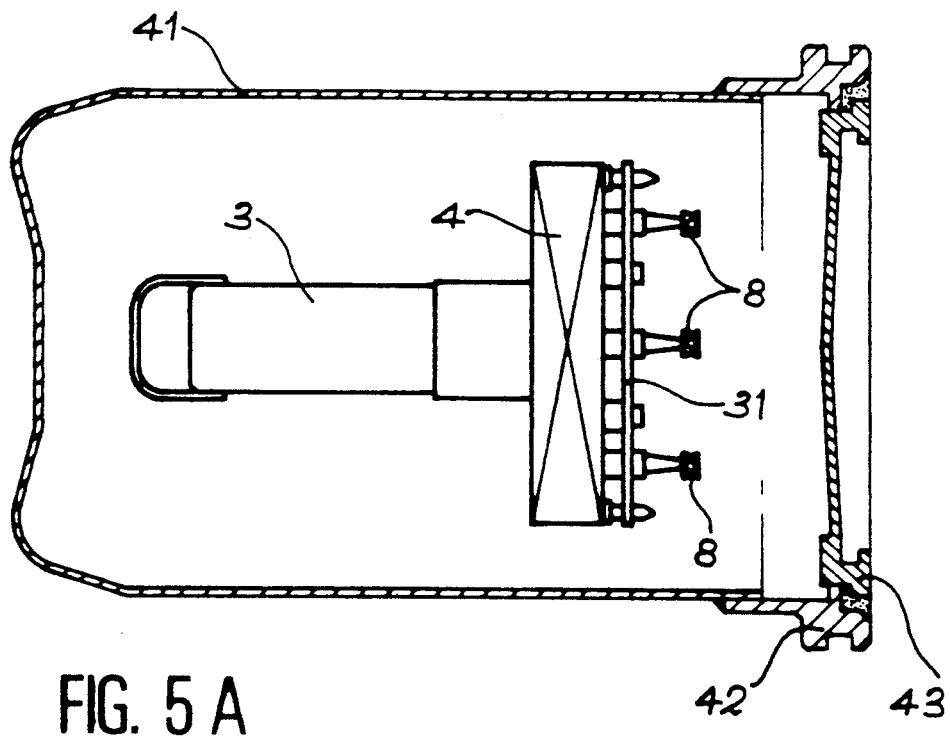
Figure 5:
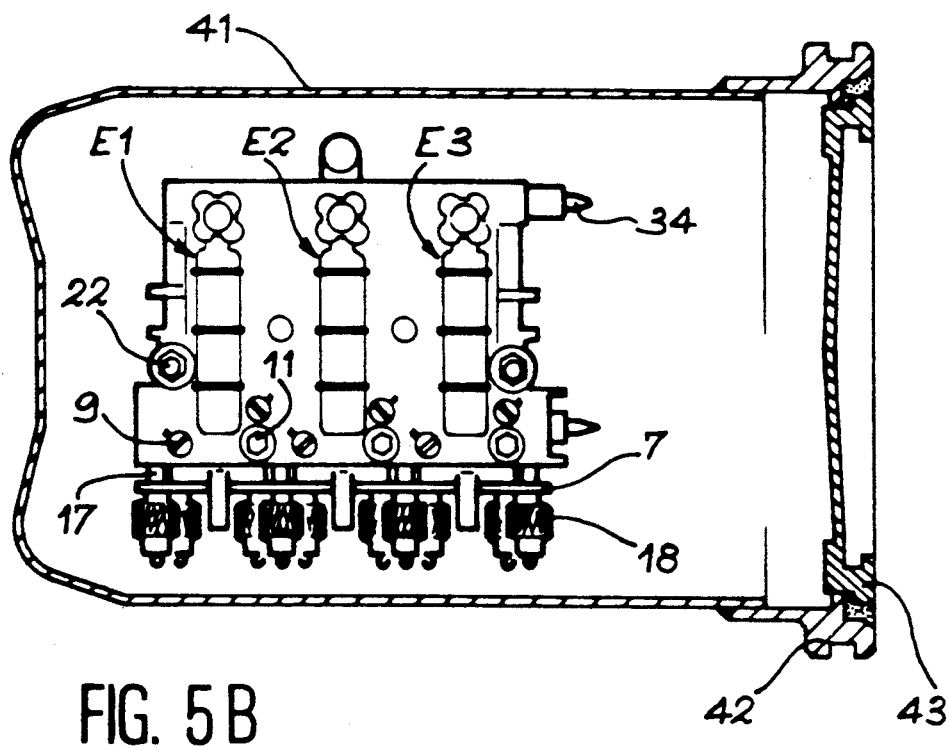

FIGS. 5A and 5B show the possibility of confining the two main parts of a module, in each case in a container of the "dustbin" type, or which is specially designed for transportation purposes. Thus, FIG. 5A shows the motor block constituted by the motor 3 of the gear box 4 of the upper plate 31 and the turbines 8 installed vertically in accordance with the axis of revolution of the corresponding container 41. The container 41 has a flange 42 and a plug 43. The container 41 is relatively small, because it complies with the safety standards to be respected for the transportation or storage of certain irradiated materials or products. The size and shape of each of the two main parts of the motor blocks enable the latter to be installed in such a container 41.

FIG. 5B shows the casing of the module confined in the same way in a container 41 closed by a plug 43 by means of a flange 42.

The invention has certain advantages, because it makes it possible to form a mixer-settler having numerous, e.g. nine stages, i.e. 3×3 modules, while permitting its manipulation and regulation by a telemanipulator. Thus, a telemanipulator can raise objects having a relatively limited weight. The subdivision of the stages of a mixer-settler into several separable modules makes it possible to carry out the fitting, dismantling and maintenance, e.g. the replacement of shield windows 12 or a sealing plate 28.

The weight of the motorization assembly comprising the motor 3, the gear box 4 and the upper plate 31 may only be 5 kg. The module casing weighs less than 10 kg. Under these conditions, a tight shielded enclosure telemanipulator can handle such objects.

It is important that such a mixer-settler can withstand the action of virtually all chemical agents and high activity radioactive products. To this end, the elements are preferably made from a stainless steel of a type resistant to deterioration by chemical agents and radioactive products, with the exception of the motors, joints and gears. Thus, the latter elements are considered as being "consumable" and can therefore easily be replaced, in the same way as the shield windows.

Thus, in summarizing, the mixer-settler according to the invention meets the dimensional and weight constraints associated with remote manipulation and the desired number of mixer settler means. The presence of a replaceable shield window makes it possible to see the interphases of a working phase.

The settings and regulations can take place by using the telemanipulator as a result of the position of all the control elements of a module. All the operations (horizontality of the module means, regulation of the different interphase levels, control of the flow of the different light and heavy phases) can be carried out by the telemanipulator at the front part of the mixer-settler.

I claim:

1. Mixer-settler having separate stages and mechanical stirring, each stage comprising a mixing chamber (1), a turbine (8) contained within the mixing chamber which is rotated by motor means (3, 4), a settling chamber (2) linked with the mixing chamber (1), circulation pipes (39) for light and heavy phases and arranged to connect to corresponding pipes of adjacent stages, at least one inlet (EL, El) and one outlet (SL, Sl) for the respectively heavy and light phases, an interphase level regulator member (11) and connecting means (9, 10) for the said connecting to at least one inlet and outlet of the light and heavy phases, wherein the mixer-settler has separable modules (M1, M2, M3), each of said modules having at least one of said stages (E1, E2, E3) and means for tight connection to one or more adjacent modules such that each module is adapted to be manipulated by a telemanipulator and be remotely manipulated and used when it is isolated in a tight enclosure and inaccessible to an operator.

2. Mixer-settler according to claim 1, wherein said at least one inlet and outlet are located on a front face (40) of the module.

3. Mixer-settler according to claim 1, further comprising on each lateral face of said modules (M1, M2), two lateral openings (38) for linking the light and heavy phases, said openings being adapted to connect to corresponding lateral openings of the said one or more adjacent modules (M2, M3).

4. Mixer-settler according to claim 1, wherein each of the regulator members and connecting means (9, 10, 11) are located on a front of an upper surface (31) of each of said modules.

5. Mixer-settler according to claim 1, wherein each stage (E1, E2, E3) has a remotely dismantlable shield window (12) placed on a front face (40) thereof, said shield window facing the settling chamber (2) so as to enable visualization of the interphase between the light and heavy phases.

6. Mixer-settler according to claim 1, wherein each module (M1, M2, M3) has three stages (E1, E2, E3).

7. Mixer-settler according to claim 1, wherein the motor means have, for each of said modules, a motor (3) placed on an upper surface (31) of said module which drives a gear box, said gear box (4) having one outlet per stage for driving the turbine (8) within each mixing chamber (1), a height position of the turbine (8) and rotational speed of the motor (3) being regulatable.

8. Mixer-settler according to claim 1, wherein the tight connecting means between the modules (M1, M2 and M3) comprise a sealing plate (28) placed between adjacent modules at lateral openings of the modules (38) and a capstan locking system (19, 20, 21) for locking together adjacent modules (M1, M2) or (M2, M3).

* * * * *

UNITED STATES PATENT AND TRADEMARK OFFICE
CERTIFICATE OF CORRECTION

PATENT NO. : 5,254,244

DATED : October 19, 1993

INVENTOR(S) : Rodolph Chomel

It is certified that error appears in the above-identified patent and that said Letters Patent is hereby corrected as shown below:

Column 2, line 10, delete "dismantable" and insert --dismantlable--.

Column 6, Claim 2, line 18, delete "module" and insert --respective modules--.

Signed and Sealed this

Third Day of May, 1994

Attest:

BRUCE LEHMAN

*Attesting Officer*     *Commissioner of Patents and Trademarks*